United States Patent [19]

Rhodes

[11] 4,277,801

[45] Jul. 7, 1981

[54] COLOR FILTER HAVING VERTICAL COLOR STRIPES WITH A NONINTEGRAL RELATIONSHIP TO CCD PHOTOSENSORS

[75] Inventor: Roland N. Rhodes, Belle Mead, N.J.

[73] Assignee: RCA Corporation, New York, N.Y.

[21] Appl. No.: 118,301

[22] Filed: Feb. 4, 1980

[51] Int. Cl.³ .............................................. H04N 9/07
[52] U.S. Cl. .................................................... 358/55
[58] Field of Search ............................. 358/41, 44, 55

[56] References Cited

U.S. PATENT DOCUMENTS 4,214,264  7/1980  Hayward et al. ...................... 358/44

Primary Examiner—Robert L. Richardson
Attorney, Agent, or Firm—Paul J. Rasmussen; William H. Meise; Henry I. Steckler

[57] ABSTRACT

A color encoding filter for use with a discrete photosensor pickup device has vertical stripes. The stripes occur in repeating cycles of color order, with the ratio of the width of a cycle to the width of a photosensor being a non-integer. This results in wider bandwidth in a luminance signal.

9 Claims, 4 Drawing Figures

COLOR FILTER HAVING VERTICAL COLOR STRIPES WITH A NONINTEGRAL RELATIONSHIP TO CCD PHOTOSENSORS

BACKGROUND OF THE INVENTION

The present invention relates to color filters, and more particularly, to color filters having vertical stripes for use with cameras having an array of discrete sensors, such as CCD (charge coupled device) cameras.

As was pointed out in prior patent application Ser. No. 094,285, filed Nov. 19, 1979 in the name of R. Rhodes (RCA 74,184), a conventional vertical stripe color filter when placed in front of the CCD camera limits the bandwidth of the luminance signal to two-thirds of that determined by the Nyquist limit, which in turn is determined by the number of photosensors in a horizontal row of the CCD. In particular, if there are 320 photosensitive elements per horizontal line in the CCD, 320 sensors are scanned in 53 microseconds for a theoretical bandwidth of about 3 mHz. In the presence of a vertical stripe filter, the bandwidth is actually limited to about 2 mHz for the reasons as set forth in said prior application.

It is therefore desirable to have a color encoding filter for use with a CCD pickup device having a plurality of photosensitive elements which results a wider usable frequency response in the resulting luminance signal.

SUMMARY OF THE INVENTION

In brief, this is achieved by having a filter with a plurality of vertical stripe color filters arranged in horizontally repeating cycles of color order, the ratio of the width of a cycle to the width of a photosensor being a noninteger.

DETAILED DESCRIPTION

Figure 1:
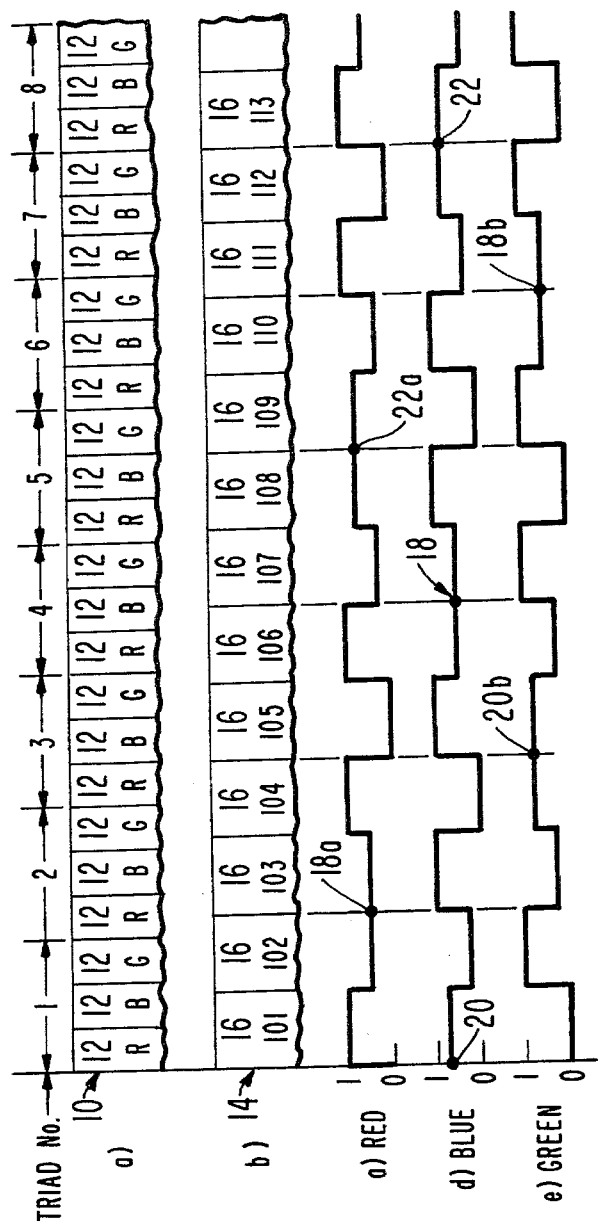
FIG. 1 shows a nonintegrally aligned vertical stripe color filter in accordance with the invention, together with a portion of a row of photosensors of a CCD camera and some signals resulting therefrom.

FIG. 1A shows the color filter 10 comprising vertically extending color stripes 12. The stripes 12 occur in triads or groups each including red (R), blue (B), and green (G) color stripes. Eight such triads 1–8 are shown in this figure. The filter 10 may be aligned with a CCD (charge coupled device) television camera imaging or pickup device. Each CCD device consists of a vertically extending array of horizontal rows of discrete image sensors. A portion 14 of the top of one such pickup device, as shown in FIG. 1B, comprises a plurality of horizontally arrayed photosensitive elements 16. Striped filter 10 is shown separated from row 14 of photosensors 16 for clarity, but it should be understood that light falling upon any row of photosensors of the CCD passes through a portion of filter 10. It will be noted that there are exactly seven color triads, designated by reference numbers 1 to 7, in the horizontal length occupied by twelve photosensitive elements 16 in the particular embodiment of FIG. 1. Each triad of vertically extending color stripes is larger in its horizontal dimension than the width of one photosensor, but each triad is smaller than the width of two photosensors. The left side of the left-most R stripe of triad 1 in FIG. 1A is aligned vertically with the left end of photosensor 101 of FIG. 1B. However, the right end of the G stripe of triad 1 is not vertically aligned with the edge of any photosensor of row 14. The next alignment of the edge of a photosensitive element 16 with an edge of a color triad occurs at the right edges of the green stripe of triad 7 and the right edge of photosensitive element 112. The right edge of photosensitive element 112 is also aligned with the left edge of a red stripe of triad 8. The next alignment, however, does not occur until the right edge of the twenty fourth photosensitive element (not shown) in row 14. It can be seen, therefore, that the alignment of the photosensitive elements of row 14 with vertically extending stripe filter 10 has cyclical variations of alignment in the horizontal direction. In a typical CCD camera, each row may include 320 photosensitive elements 16. There are, therefore, 320 divided by 12, which equals twenty-six and two-thirds repeat cycles across a horizontal line.

FIGS. 1C, D and E show the amplitude of the output signal from portion 14 of the CCD imager when viewing a flat red, blue or green fields respectively. The output signal is available simultaneously from the photosensitive elements, but is normally read out sequentially, so the horizontal dimensions of FIGS. 1C and 1D may be considered to represent either time or the position along row 14 at which the output signal of a particular photosensor is available. The amplitude of the output signal of a photosensor which occurs when a particular color is viewed is proportional to the area of that particular color filter which is disposed over that particular photosensor. Note that filter 10 allows a combination of red and blue light to fall on photosensor 101, a combination of blue, green, and red light to fall on photosensor 102, 103, etc. The wave forms of FIGS. 1C, D and E are identical except for a phase shift therebetween of one-third (120°) of a repeat cycle (360°) of 7 color filter triads to 12 photosensitive elements. Considering now the blue field output signal of FIG. 1D, it will be seen that it includes a high frequency component with a period extending over the width of two photosensors. Therefore, there are 320 divided by 2, which equals 160 such high frequency cycles in each horizontal line, and since it takes 53 microseconds to scan one horizontal line in an NTSC system, each high-frequency cycle has a duration of 0.331 microseconds and the corresponding frequency equals 3 mHz. If it were continuous, this 3 mHz signal would comprise a carrier signal. Note however that at point 18 in the waveform there is a polarity reversal. This polarity reversal occurs every six photosensor elements, and thus also at points 20 and 22. This polarity reversing signal comprises an envelope of the carrier, and it has a frequency equal to 3 mHz divided by 6 cycles, or 0.5 mHz. Since the carrier phase reverses periodically, it is suppressed. The result is a 3 mHz suppressed-carrier signal with sideband "subcarriers" at 2.5 mHz and 3.5 mHz due to beats between the carrier and the envelope signal. The same phase reversal occurs in the signal output when viewing a red scene at points 18a and 22a, and similarly when viewing a green scene at points 18b and 20b. Therefore, the same double sideband suppressed carrier signal occurs for red and green scenes with the 120 degree phase shift noted above. The amplitude of the sidebands contains the color saturation information, while their phase contains the hue information due to the phase shift between the waveforms as shown in FIGS. 1C, D and E. For example, when viewing a magenta (red and blue) scene, the phase reversal point 18 occurs between photosensors 104 and 105, which is a 60 degree phase shift from that of the red scene signal of FIG. 1C.

Figure 2:
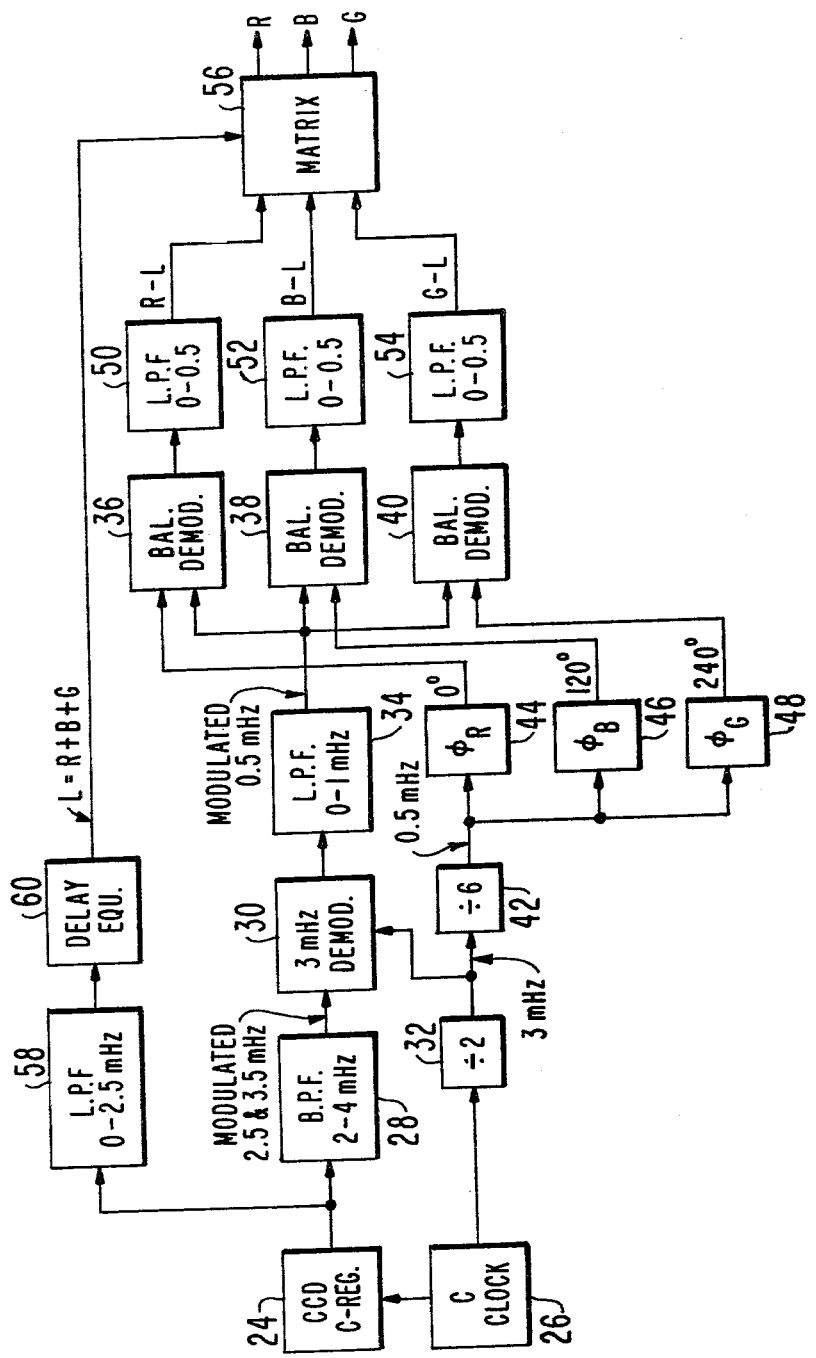
FIG. 2 shows a decoding system for use with the invention.

FIG. 2 shows a decoding system for the above described camera. A C-register 24, which may be part of the internal circuitry of the CCD image pickup device 10, is driven by a 6 mHz clock 26. Register 24 provides an output signal which is applied to a low pass filter 58 of a luminance channel and to a bandpass filter (BPF) 28 of a chrominance channel. Filter 28 has a 2 to 4 mHz bandpass. The output signal from CCD C-register 24 is filtered by filter 28 and the filtered signal comprises the double sideband suppressed carrier signal with sideband subcarriers at 2.5 mHz and 3.5 mHz. The filtered signal is applied to a product detector demodulator 30 centered at 3 mHz. This demodulator also receives a 3 mHz demodulation signal, which is derived from a divide by two frequency divider 32 from a clock 26 to supply a carrier for demodulating the suppressed carrier signal. Demodulator 30 produces a signal having a frequency response extending to 7 mHz due to the sum component of the modulation products. The output of the demodulator 30 is passed through a 1 mHz cut-off frequency lowpass filter 34 (for the purpose of passing the difference components and removing the sum components), and then is supplied to balanced demodulators 36, 38 and 40 for color separation. The 3 mHz signal from divider 32 is again frequency divided by divider 42 by a factor of 6 to produce a 0.5 mHz drive signal synchronous with the 0.5 mHz sideband signal being processed. This 0.5 mHz drive signal in turn is applied to phase shifters 44, 46 and 48 to produce 0°, 120° and 240° phase shifted signals, which are supplied to demodulators 36, 38 and 40 respectively to demodulate along 0°, 120° and 240° axes to separate the color signals. The output of demodulators 36, 38 and 40, which provide red, blue and green color difference signals respectively, are lowpass filtered by 0.5 mHz cut-off filters 50, 52 and 54 respectively, and from there the lowpassed filtered color difference signals are applied to a matrix 56 of known type.

The output of the C register 24 is also applied to a lowpass filter 58 that has 2.5 mHz cutoff frequency, as mentioned. Its output in turn is applied to a delay equalizer 60 which compensates for the delay incurred by the color difference signals in going through some of the above-described circuitry. The luminance signal is then applied to the matrix 56, which then mixes it with the color difference signals to produce red, blue and green color output signals having a bandwidth from 0 to 2.5 MHz.

Other demodulation schemes are possible. For example, one can use three phases of a continuous 2.5 mHz signal derived from clock 26 to demodulate the C register output signal band limited to 2 to 3 mHz by a bandpass filter. Rather than demodulating the lower sideband, the upper sideband may be demodulated at 3.5 mHz by restricting the passband of BPF 28 to 3 to 4 mHz. Further, if in this latter approach, an optical lowpass filter having a 3 mHz cut-off frequency is incorporated in the optical path including filter 10, high frequency luminance-to-color aliasing is avoided, since there will be no luminance signals near the 3.5 mHz color carrier. It will be noted that since 3.0 mHz is the Nyquist limit of a CCD having 320 photosensors per horizontal line in an NTSC system, limiting the input resolution to 3.0 mHz does not restrict the available luminance bandwidth.

Figure 3:
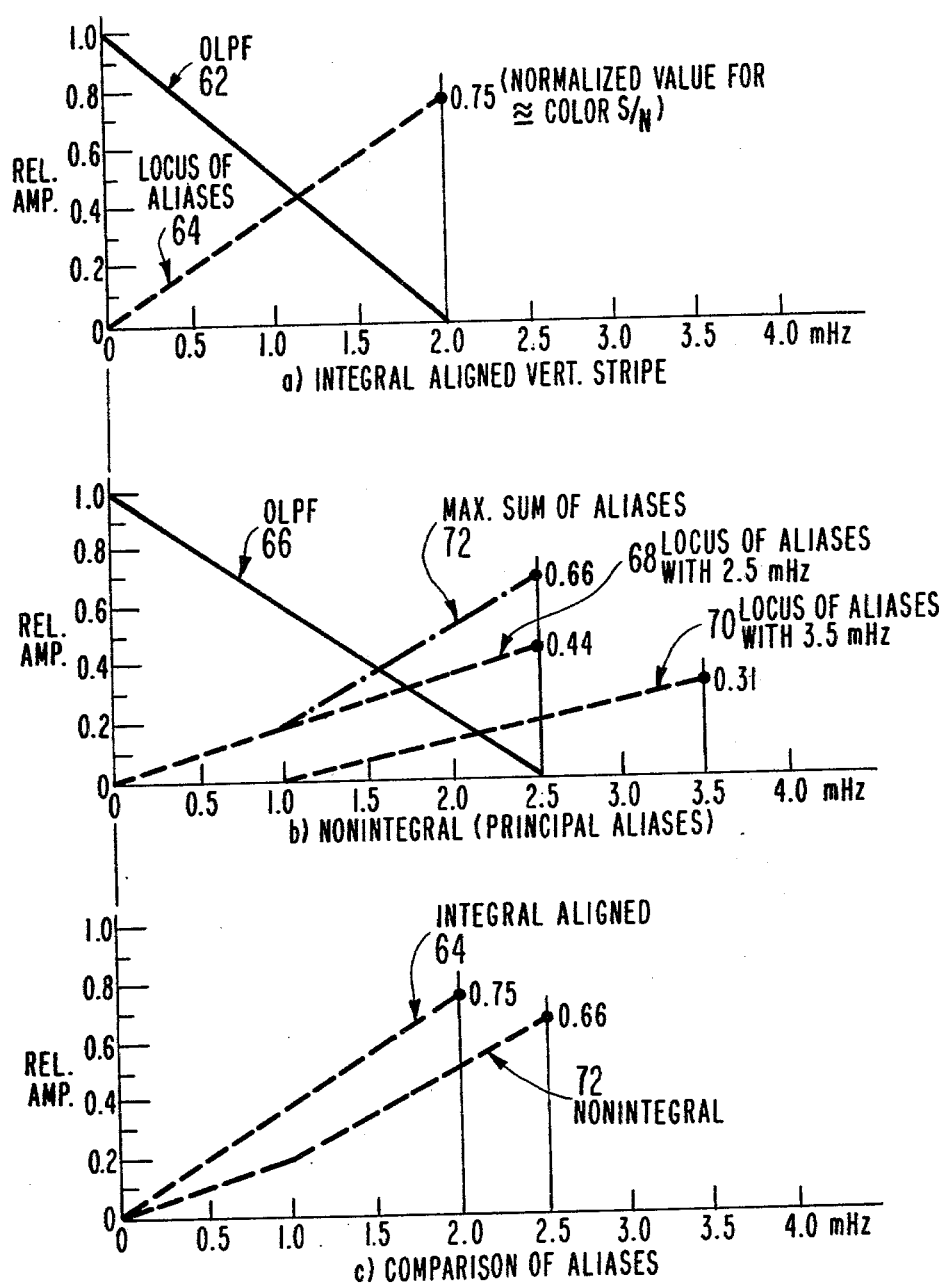
FIG. 3 shows the spectral distribution of aliases that result with the invention.

FIG. 3A shows a simplified first order comparison of the aliasing from a wide band single color primary color scene into the luminance channel of an integral aligned vertical stripe color filter as described in the aforementioned Rhodes application when used with a CCD camera. "Aliasing" in this context refers to spurious signals developed when a desired signal is processed through a sampling or modulating system. The sampling occurs due to the presence of the vertical stripes of the color filter. It has been assumed that the Nyquist limit of the CCD camera is 3 mHz and the amplitude of the output signal at peak white level is normalized to 1. Line 62 shows the frequency response of an optical lowpass filter having a 2 mHz cut-off frequency. This filter is disposed in front of the vertical color stripe filter. A color "carrier" is present at 2 mHz when the imager is viewing any scene other than a balanced white scene. It will have an amplitude of 1 unit peak-to-peak. In FIG. 3A the amplitude of this "carrier" has been normalized to 0.75 peak-to-peak which provides the same color signal-to-noise ratio as in one version of the non-integral aligned camera of the present invention. As will be seen, curve 64 represents the locus of aliases of a full strength primary color signal pickup into the luminance signal. FIG. 3B shows color "subcarriers" at 2.5 and 3.5 mHz resulting from the sidebands for the non-integrally aligned case of the present invention. An optical lowpass filter curve with a cut-off frequency of 2.5 mHz is shown by curve 66. Curve 68 shows the locus of aliases with respect to the 2.5 mHz carrier, while curve 70 shows the locus of aliases with respect to the 3.5 mHz subcarrier. It can be shown using Fourier analysis of the waveforms of FIGS. 1C, D, and E that the amplitudes of the subcarriers are not equal. In particular, the amplitude of the 3.5 mHz subcarrier is lower than the 2.5 mHz signal. It will be seen that they therefore form a maximum sum of aliases shown by curve 72. For comparison purposes, FIG. 3C shows the curves 64 and 72 on the same graph where it will be seen that the non-integrally aligned case is clearly superior to the conventional integral aligned vertical stripe system with respect to alias amplitude.

With 320 photosensors per line available in a CCD imaging device, the luminance response must be electrically attenuated in the order of 20 to 30 DB at 2.5 mHz for the non-integrally aligned case to prevent the appearance of that frequency when viewing a fully saturated color field. This compares with a similar attenuation required at about 2 mHz in the case of the integrally aligned vertical stripe system. This amounts to a 25% improvement, but the improvement can become more significant when more CCD photosensors per line are used. For example, if a CCD were available having 480 horizontal photosensors in each line (Nyquist bandwidth of about 4.5 mHz), and the color signals were frequency restricted to 500 kHz, the frequency at which said required attenuation is applied in a conventional aligned vertical striped system could be raised from 2 mHz to 3 mHz, while that of the non-integrally aligned system could be raised from 2.5 to 4 mHz. Under these circumstances, it might be more advantageous in the non-integral system to limit the luminance response by both optical and electrical lowpass filtering to 3.5 mHz.

This results in complete removal of high frequency luminance-to-color aliasing and a considerable reduction in color-to-luminance aliasing.

The twelve photosensor to seven triad cycle pattern as described above is a good choice; however, variations are possible. A twelve to five pattern works in almost the same manner. The ratio of the photosensor to triad count within a complete cycle is desirably a fractional number near two, so that a color triad covers approximately (but not exactly) two photosensors, and the CCD signal output from a color field includes a strong color-conveying "subcarrier" near the CCD imager's Nyquist limit. If the ratio approaches 3 or over, the color-conveying subcarrier becomes much lower in frequency and severely compromises the available luminance bandwidth. If the ratio is below one, each photosensor is associated with a portion of a complete color triad and color decoding becomes very difficult. The practical ratio must be fractional since we are limited to numbers between one and three by the above; the only other possibility is two itself. However, with a ratio of exactly two, we have two 180° out of phase colors over adjacent photosensors. This provides only a single piece of color information, so that the matrix equations cannot be set up. It is interesting to note that when the ratio of photosensors to triads is 1.5, the colors over each pixel add up to either R+B, B+G, or G+R, which is equivalent to a magenta, cyan and yellow filter which is integrally aligned with the photosensor.

Figure 4:
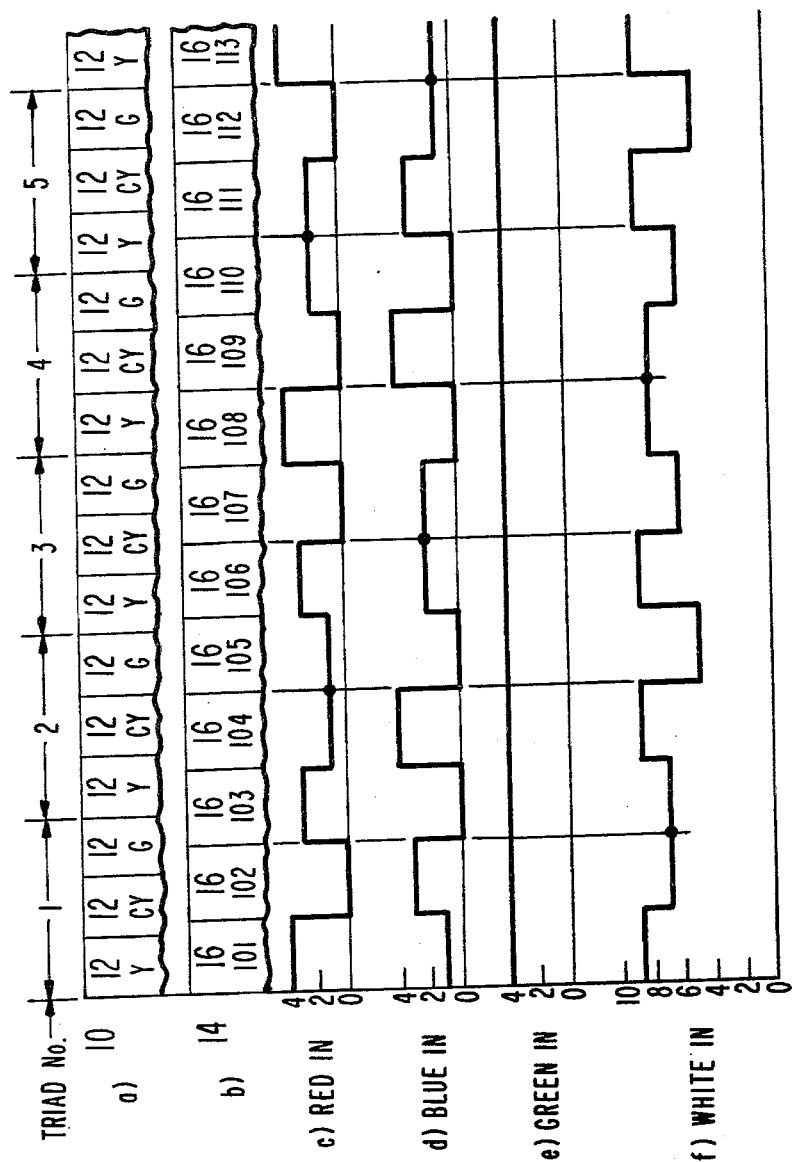
FIG. 4 shows another filter in accordance with the invention.

A primary-secondary color filter can also be used as shown in FIG. 4, where corresponding components have been given corresponding reference numbers. It will be seen that it is made up of yellow, cyan and green vertical stripes. This system has the advantage that the color filter can be made from only two colors, since the green areas can be produced by overlapping the yellow and cyan areas. These areas must be carefully matched in transmittance to provide a flat output when viewing a green field. One disadvantage of such a primary-secondary color filter is that there will be "subcarrier" developed when viewing a white field. However, it is believed that by incorporating a green-clear optical grating having a low cut-off frequency, for example near 1 mHz, a number of advantages can be obtained. First, the high frequency red and blue signal information is removed by the grating, and many of the most objectionable aliases due to these colors will be eliminated. Second, since the high frequencies will be due to green only, a common operating method even in studio cameras, and since there is no "subcarrier" when viewing green, there will be little aliasing when viewing a wideband green or white field. Demodulation of the signals produced by a CCD with a primary-secondary color filter and a green-clear grating can be accomplished by a demodulator similar to that of FIG. 2.

What is claimed is:

1. A filter for use with an image pickup device having a plurality of photosensors, said filter comprising a plurality of vertical stripe color filters arranged in horizontally repeating cycles of color order, the ratio of the width of a cycle to the width of a photosensor being a non-integer.

2. A filter as claimed in claim 1, wherein said ratio is between one and three.

3. A filter as claimed in claim 2, wherein said ratio is approximately two.

4. A filter as claimed in claim 1, wherein said ratio is twelve to five.

5. A filter as claimed in claim 1, wherein said ratio is twelve to seven.

6. A filter as claimed in claim 1, wherein each of said cycles comprises a triad of three different colors.

7. A filter as claimed in claim 6, wherein said colors comprise red, blue, and green.

8. A filter as claimed in claim 6, wherein said colors comprise yellow, cyan and green.

9. A filter as claimed in claim 8, said filter comprising a first cyan section and an overlapping second yellow section, said sections producing green at the overlap.

* * * * *